United States Patent [19]
Legrand

[11] Patent Number: 6,020,930
[45] Date of Patent: *Feb. 1, 2000

[54] METHOD AND APPARATUS FOR GENERATING AND DISPLAYING A BROADCAST SYSTEM PROGRAM GUIDE

[75] Inventor: Ludovic Legrand, La Jolla, Calif.

[73] Assignees: Sony Corporation, Tokyo, Japan; Sony Electronics, Inc., Park Ridge, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/927,104

[22] Filed: Aug. 28, 1997

[51] Int. Cl.$^7$ .................................................. H04N 5/445
[52] U.S. Cl. ........................ 348/569; 348/564; 348/906; 348/601
[58] Field of Search ..................................... 348/569, 906, 348/601, 564, 565, 588, 589, 600; H04N 5/50, 5/445

[56] References Cited

U.S. PATENT DOCUMENTS

| | | | |
|---|---|---|---|
| 4,751,578 | 6/1988 | Reiter et al. ............................. | 358/183 |
| 4,855,833 | 8/1989 | Kageyama et al. ...................... | 358/183 |
| 5,040,067 | 8/1991 | Yamazaki ................................ | 358/183 |
| 5,179,641 | 1/1993 | Comins et al. .......................... | 395/132 |
| 5,223,924 | 6/1993 | Strubbe . | |
| 5,253,066 | 10/1993 | Vogel ...................................... | 358/188 |
| 5,283,561 | 2/1994 | Lumelsky et al. ....................... | 340/721 |
| 5,315,392 | 5/1994 | Ishikawa et al. ........................ | 348/570 |
| 5,317,403 | 5/1994 | Keenan .................................... | 348/731 |
| 5,323,234 | 6/1994 | Kawasaki ................................. | 348/6 |
| 5,353,121 | 10/1994 | Young et al. ............................ | 348/563 |
| 5,398,074 | 3/1995 | Duffield .................................. | 348/564 |
| 5,416,508 | 5/1995 | Sakuma et al. .............................. | 348/3 |
| 5,436,676 | 7/1995 | Pint et al. ................................ | 348/734 |
| 5,465,113 | 11/1995 | Gilboy .................................... | 348/5.5 |
| 5,502,504 | 3/1996 | Marshall et al. . | |
| 5,512,955 | 4/1996 | Toyoshima et al. ..................... | 348/569 |
| 5,523,796 | 6/1996 | Marshall et al. ......................... | 348/589 |
| 5,524,195 | 6/1996 | Clanton, III et al. .................... | 395/155 |
| 5,528,304 | 6/1996 | Cherrick et al. ......................... | 348/565 |
| 5,532,753 | 7/1996 | Buchner et al. ......................... | 348/569 |
| 5,532,754 | 7/1996 | Young et al. ............................ | 348/569 |
| 5,559,550 | 9/1996 | Mankovitz .................................. | 348/6 |
| 5,585,866 | 12/1996 | Miller et al. ............................. | 348/731 |
| 5,589,892 | 12/1996 | Knee et al. . | |
| 5,594,509 | 1/1997 | Florin et al. ............................. | 348/731 |
| 5,596,373 | 1/1997 | White et al. ............................. | 348/569 |
| 5,621,456 | 4/1997 | Florin et al. ................................ | 348/7 |
| 5,671,411 | 9/1997 | Watts et al. ............................. | 395/615 |
| 5,703,795 | 12/1997 | Mankovitz .......................... | 364/514 R |
| 5,719,637 | 2/1998 | Ohkura .................................... | 348/564 |
| 5,731,844 | 3/1998 | Rauch et al. ............................ | 348/563 |
| 5,737,029 | 4/1998 | Ohkura .................................... | 348/564 |
| 5,745,909 | 4/1998 | Perlman et al. ......................... | 707/513 |
| 5,796,407 | 8/1998 | Rebiai et al. ............................ | 345/430 |
| 5,828,420 | 10/1998 | Marshall et al. . | |

*Primary Examiner*—Sherrie Hsia
*Attorney, Agent, or Firm*—Blakely, Sokoloff, Taylor & Zafman LLP

[57] ABSTRACT

A method and apparatus for generating an on-screen guide by which a user may select channels to view in a multiple channel broadcasting system are provided. According to one aspect of the invention, a program guide is generated comprising a number of still video pictures that represent current programming on a number of channels. The program guide is generated by the system tuning sequentially to each one of a number of channels. A visually usable video frame is captured from one of the number of channels. The visually usable video frame is then decimated. Each of the steps of tuning, capturing, and decimating are then repeated for each of a selected number of channels. Following generation, the program guide is displayed on a screen or display. A system pointer is displayed on the screen along with the program guide, and the system pointer is manipulated in response to input by the user. A channel is selected for viewing by manipulating the system pointer to an area associated with the still video picture of the corresponding channel.

22 Claims, 8 Drawing Sheets

METHOD AND APPARATUS FOR GENERATING AND DISPLAYING A BROADCAST SYSTEM PROGRAM GUIDE

FIELD OF THE INVENTION

The present invention relates to the presentation of channel, program, and broadcast information for a multiple channel television broadcast system. Specifically, the present invention relates to the presentation of a video picture program guide.

BACKGROUND OF THE INVENTION

Television broadcasting technology has improved tremendously since its inception. Today, television signals are broadcasted on the airwaves, through cables, and via satellite. The number of stations accessible today has increased to hundreds of stations. To select a program to view, many viewers simply "channel surf" until they find a channel that has a desirable program. Channel surfing refers to the process of using the channel "+" or "−" key to sequentially view each channel. Although some viewers find channel surfing among hundreds of stations enjoyable, most viewers prefer a more direct method for selecting a program to view.

Some prior art television channel selection guides provide a television channel selection guide which displays a listing of the channels typically in numeric order and the titles of the programs broadcasted or to be broadcasted on the channels. The viewer or user of the system may then select the channel by entering in the channel number or selecting a program. The system responds by removing the guide displayed and tuning to the station selected and displaying the broadcast signals of the station.

In the current generation of broadcasting system technology, a viewer is provided with many options regarding programs that are available for broadcast. These options include, but are not limited to, channel surfing among program descriptions while watching a particular program on one channel. This option is typically accessed through a graphical user interface presented in one of two formats. In one format, the graphical user interface is a transparent electronic program guide that is superimposed over a broadcasted program. In a second format, the graphical user interface is an electronic program guide that is displayed along with a broadcasted program where the broadcasted program is displayed as reduced in size so that no portion of the electronic program guide covers the program. Both of these graphical user interfaces allow the user to watch one program while accessing program information for a number of other programs that are available for broadcast.

As the number of viewer options increases, so to does the need for a user-friendly system interface that accommodates all users by allowing for channel programming information to be presented in a variety of formats. Most television viewers have a limited number of favorite stations that they regularly watch. Consequently, the viewer is typically going to be most interested in the programming on these favorite stations. Thus, while prior art program guides allow the user to view one program while viewing program information for all other programs of a broadcast system, it would be advantageous to have a program guide that provides the option to view a representative sample of each of a number of programs available on a corresponding number of favorite channels.

SUMMARY OF THE INVENTION

A method and apparatus for generating an on-screen guide by which a user may select channels to view in a multiple channel broadcasting system are provided. According to one aspect of the invention, a program guide is generated comprising a number of still video pictures that represent current programming on a number of channels. The program guide is generated by the system tuning sequentially to each one of a number of channels. A visually usable video frame is captured from one of the number of channels. The visually usable video frame is then decimated, the decimation providing a video frame having smaller pixel dimensions than the captured frame. Each of the steps of tuning, capturing, and decimating are then repeated for each of a selected number of channels. Following generation, the program guide is displayed on a screen or display. Corresponding channel and program information may be displayed along with each of the number of still video pictures. A system pointer is displayed on the screen along with the program guide, and the system pointer is manipulated in response to input by the user. A channel is selected for viewing by manipulating the system pointer to an area associated with the still video picture of the corresponding channel.

These and other features, aspects, and advantages of the present invention will be apparent from the accompanying drawings and from the detailed description and appended claims which follow.

BRIEF DESCRIPTION OF THE DRAWINGS

The objects, features, and advantages of the present invention will be apparent to one skilled in the art from the following detailed description in which.

DETAILED DESCRIPTION OF THE INVENTION

In the method and apparatus of the present invention the broadcast system described is a direct broadcast satellite system; the broadcast system may also be a digital television system. However, it is readily apparent to one skilled in the art that other broadcast systems which have the capability of receiving and displaying a multiplicity of stations may utilize the method and apparatus of the present invention. Furthermore, in the following description, for purposes of explanation, numerous details are set forth, such as menus, flowcharts and system configurations, in order to provide a thorough understanding of the present invention. However, it will be apparent to one skilled in the art that these specific details are not required in order to practice the present invention. In other instances, well known electrical structures and circuits are shown in block diagram form in order not to unnecessarily obscure the present invention.

It is readily apparent to one skilled in the art that additional functions can be added to the process and functions modified or removed and still be within the spirit and scope of the invention. The system provides an innovative and user friendly access to a wealth of information regarding programming available through the broadcasting system. In the present invention a number of functions are selectable through the remote control device. It is apparent that these functions may be selectable through other devices such as a joystick or other means such as an on screen menu.

Figure 1:
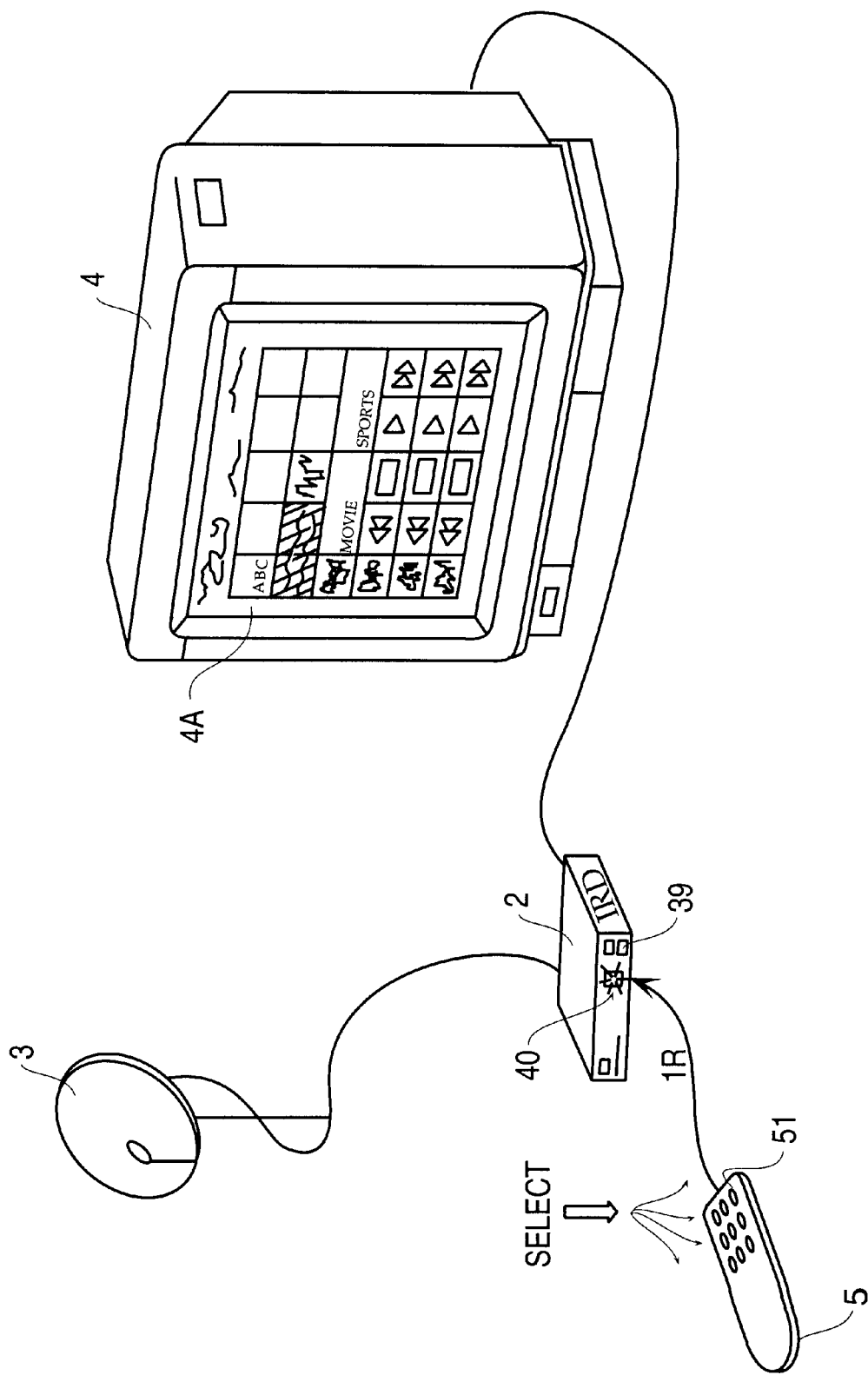
FIG. 1 is a simple illustration of one embodiment of the present invention.

FIG. 1 is a simplified diagram illustrating a Direct Satellite System (DSS). The system has an antenna 3, an integrated receiver/decoder 2 (IRD), a remote controller 5, and a monitor 4. Packets of data are transmitted by a transponder on the satellite. Each transponder transmits data in a time share manner at a predetermined frequency. A tuner 21 of a decoder is tuned in to the frequency of the transponder corresponding to a channel, which is designated by a viewer so that the packets of digital data are received by the decoder.

The antenna 3 receives an encoded data signal sent from a satellite. The received encoded signal is decoded by the IRD. The antenna 3 has a low noise block down converter 3a (LNB). The LNB 3a converts a frequency of a signal sent from the satellite to another frequency. The converted signal is supplied to the IRD 3. The monitor 4 receives a signal from the IRD 3.

Figure 2:
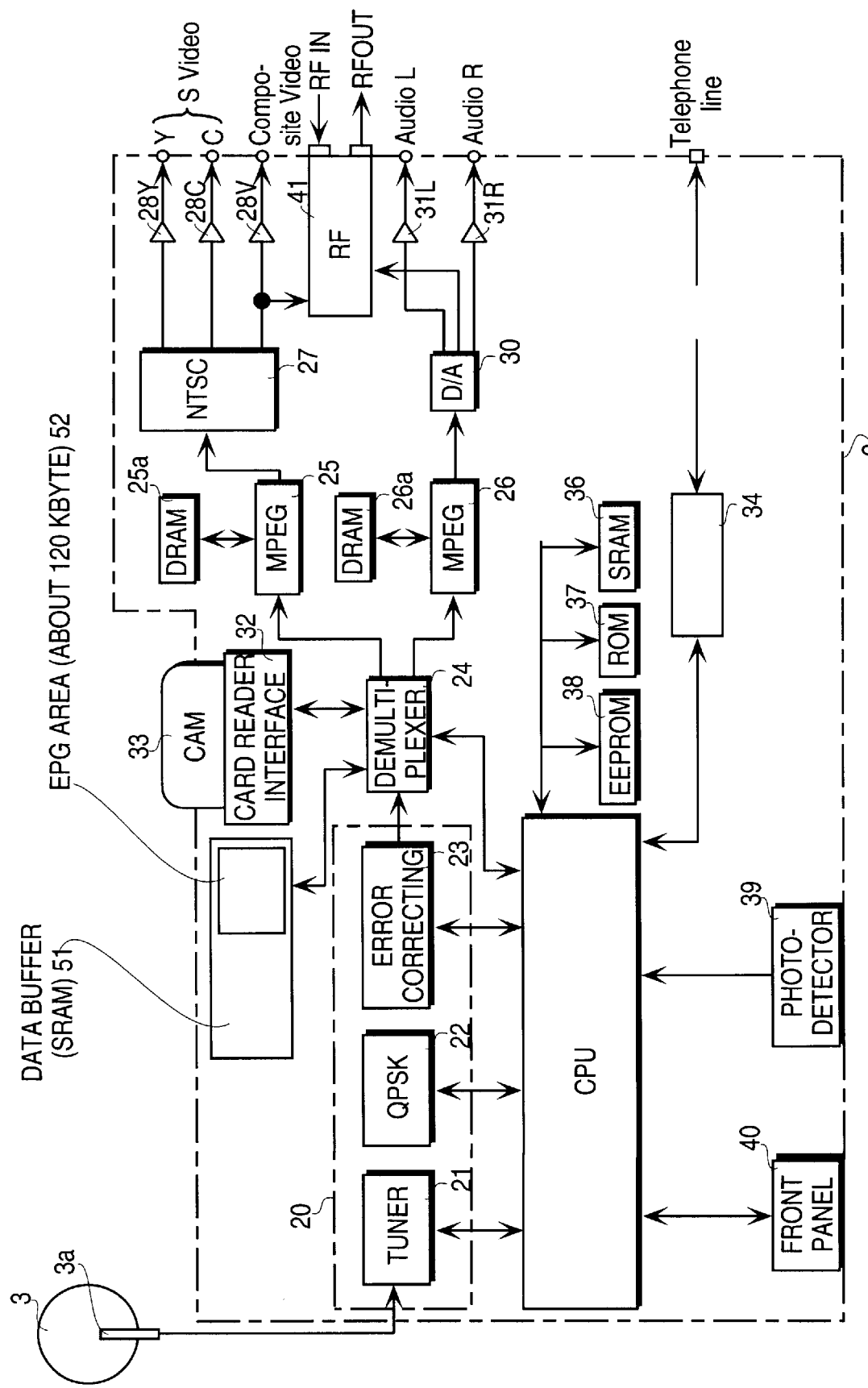
FIG. 2 is a block diagram representation of the elements utilized in the receiver of the television signals.

FIG. 2 is a block diagram of the IRD 3. A radio frequency (RF) signal output from the LNB 3a of the antenna 3 is supplied to a tuner 21 of a front end 20. The output from the tuner 21 is supplied to a quadrature phase shift keying (QPSK) demodulation circuit 22 for demodulation. The output from the QPSK demodulation circuit 22 is supplied to an error correcting circuit 23 for error correction. The data is received in encrypted and encoded (i.e., compressed) form.

The transport IC 24 receives the data stream, consisting of packets of data, from the error correcting circuit 23 and directs portions of the data stream to the appropriate circuit for processing. The digital data stream sent from a satellite includes headers for classifying the different portions of the data in the digital data stream. The transport IC stores the headers in registers and uses the headers to direct the data. The data stream sent from the satellite, includes video data in the format specified by the Motion Pictures Expert Group standard (MPEG), MPEG audio data and electronic programming guide (EPG) data. Data that is identified by its header to be video data is transferred to MPEG video decoder 25. Data that is identified by its header to be audio data is transferred to MPEG audio decoder 26. Similarly, data having a header that identifies the data to be EPG data is transferred to a predetermined area in the data buffer 51 designated to store the EPG.

A conditional access module 33, includes a central processing unit (CPU), a read-only memory (ROM) and a random access memory (RAM). The conditional access module determines whether the user has the authorization to receive certain data, e.g., audio/video for a pay TV station, using the authorization information stored in its memory. Thus, if the conditional access module determines that the user is authorized access, a key to decrypt the incoming data is provided to the transport IC 24, which decrypts the data using the key provided. In one embodiment, a smart card is utilized. This card is inserted into the card reader interface 32 for interface to the transport IC 24. It is readily apparent to one skilled in the art that the conditional access module is not limited to smart cards and may be configured in other kinds of circuitry.

The MPEG video decoder 25 decodes the video signal received from the transport IC. Dynamic random access memory (DRAM) 25a, connected to the MPEG video decoder 25, is used for buffering and storage of video data during processing by the MPEG video decoder. The decoded digital video signal is supplied to a National Television System Committee (NTSC) encoder 27 and converted to a luminance signal (Y) and a chroma signal (C) which are respectively output through a buffer amplifier 28Y or 28C as an S video signal. A composite video signal is also output through a buffer amplifier 28V.

The MPEG audio decoder 26 decodes the digital audio signal. DRAM 26a, connected to the MPEG audio decoder 26, is used for buffering of data and information during processing by the MPEG audio decoder 26. The decoded digital audio signal is converted into an analog audio signal by D/A converter 30. The left audio signal is output through buffer amplifier 31L and the right audio signal is output through buffer amplifier 31R.

An RF modulator 41 mixes a composite signal output from the NTSC encoder 27 with an analog audio signal output from the D/A converter 30. The RF modulator 41 converts the mixed signal into an RF signal and outputs the RF signal therefrom.

The CPU 29 is the central control mechanism and executes code stored in the ROM 37 to perform certain functions of the system. For example, the CPU processes certain data to control the generation of the program list in accordance with the teachings of the present invention. In addition, the CPU receives and processes the user input, received from the front panel buttons or switches 40 and the photodetector circuit 39 to provide the user functionality and access to the system described herein. In addition, the CPU accesses user settings/preferences for processing of information and configuration of the system. The user settings are stored in the non-volatile memory, such as electrically erasable programmable read-only memory (EEPROM) 38. In addition, the CPU maintains a list of pointers, stored in static random access memory (SRAM) 36, to the channel information and program information stored in the SRAM 51. Thus, when a user wishes to display a form of the EPG on the screen, the CPU 29, accessing pointers stored in the SRAM 36, communicates to the transport IC 34 to retrieve the data from the data buffer (SRAM) 51 identified by the pointers. The CPU then formulates the format and other digital data which forms the guide or list on the screen and forwards the data representative of the guide/list to the transport IC 34 which forwards the data to the DRAM 25a of the MPEG video decoder 25 for subsequent output to the screen.

Figure 3:
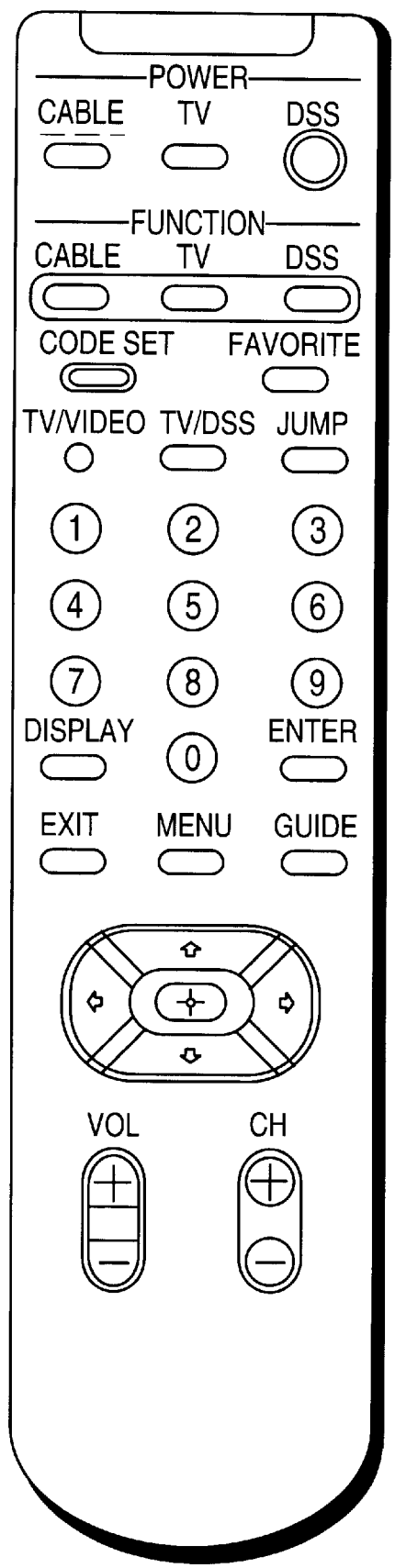
FIG. 3 is a representation of a remote control utilized to tune television stations in accordance with the teachings of the present invention.
Figure 4:
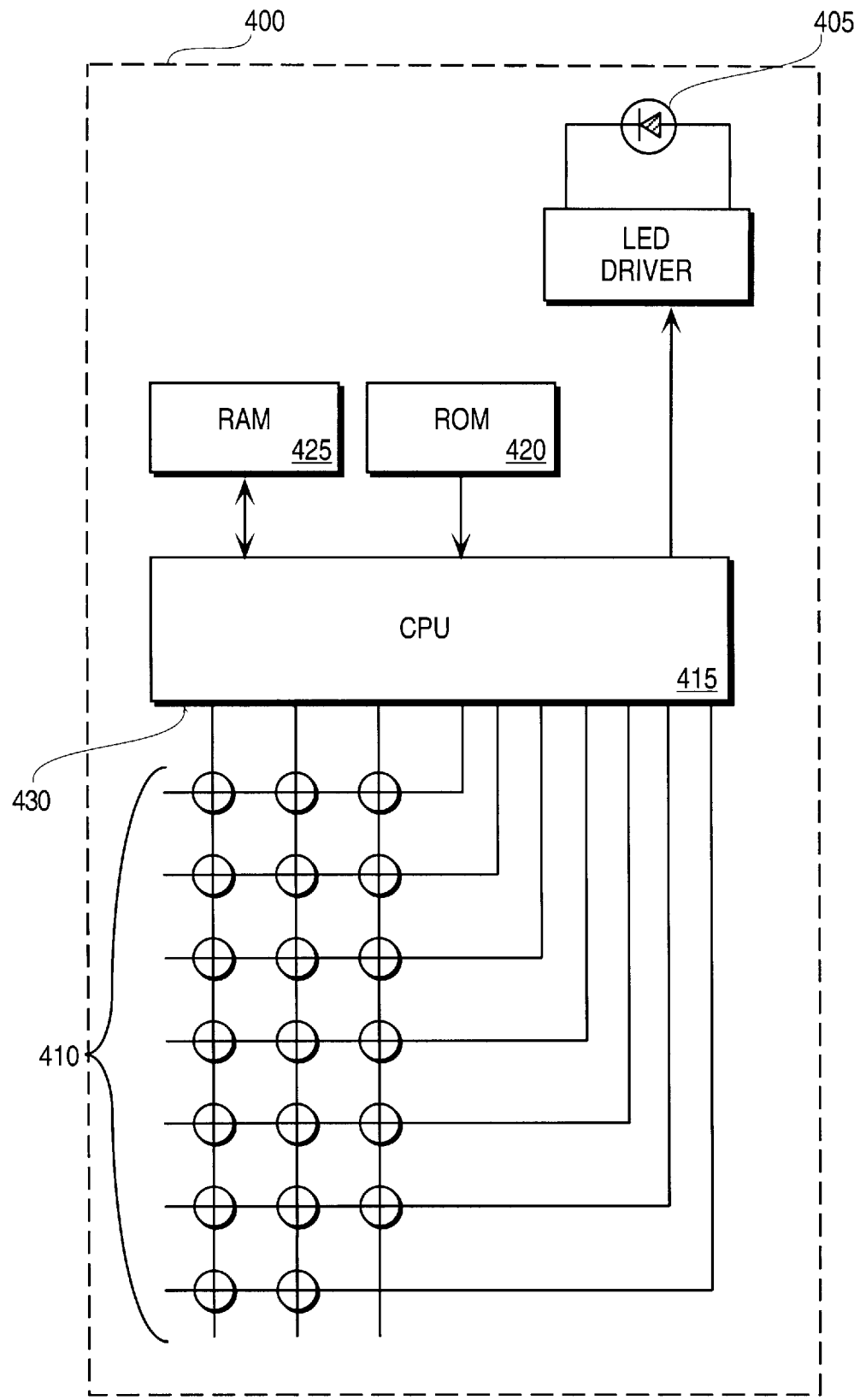
FIG. 4 is a simplified block diagram of the circuitry utilized in a remote control device.

FIG. 3 shows an example of a remote controller utilized by a user to transmit commands and make program selections in accordance with the teachings of the present invention. FIG. 4 is simplified a block diagram of the remote controller. The remote controller 400 has an infrared originating device 405, a set of operation buttons 410, a CPU 415, a ROM 420 and a RAM 425. The CPU 415 receives a signal sent from an operation button 410 through an input port 430. The signal is processed according to a program stored in the ROM 420. The RAM 425 is used as a working space so as to produce a transmitting code. The transmitting code is sent to the infrared originating device 405 through an output port and converted into an infrared signal. The infrared signal is transmitted to the IRD. The operation buttons 410 include a direction key for designating a pointer direction such as north, south, east and west, an "EPG" key, a "FAVORITE" key, a "SELECT KEY", a "MENU" key, an "EXIT" key, a ten-key numeric keypad and an "ENTER" key. The set of operation buttons 410 enable the user to select programs through the electronic programming guide.

Figure 5:
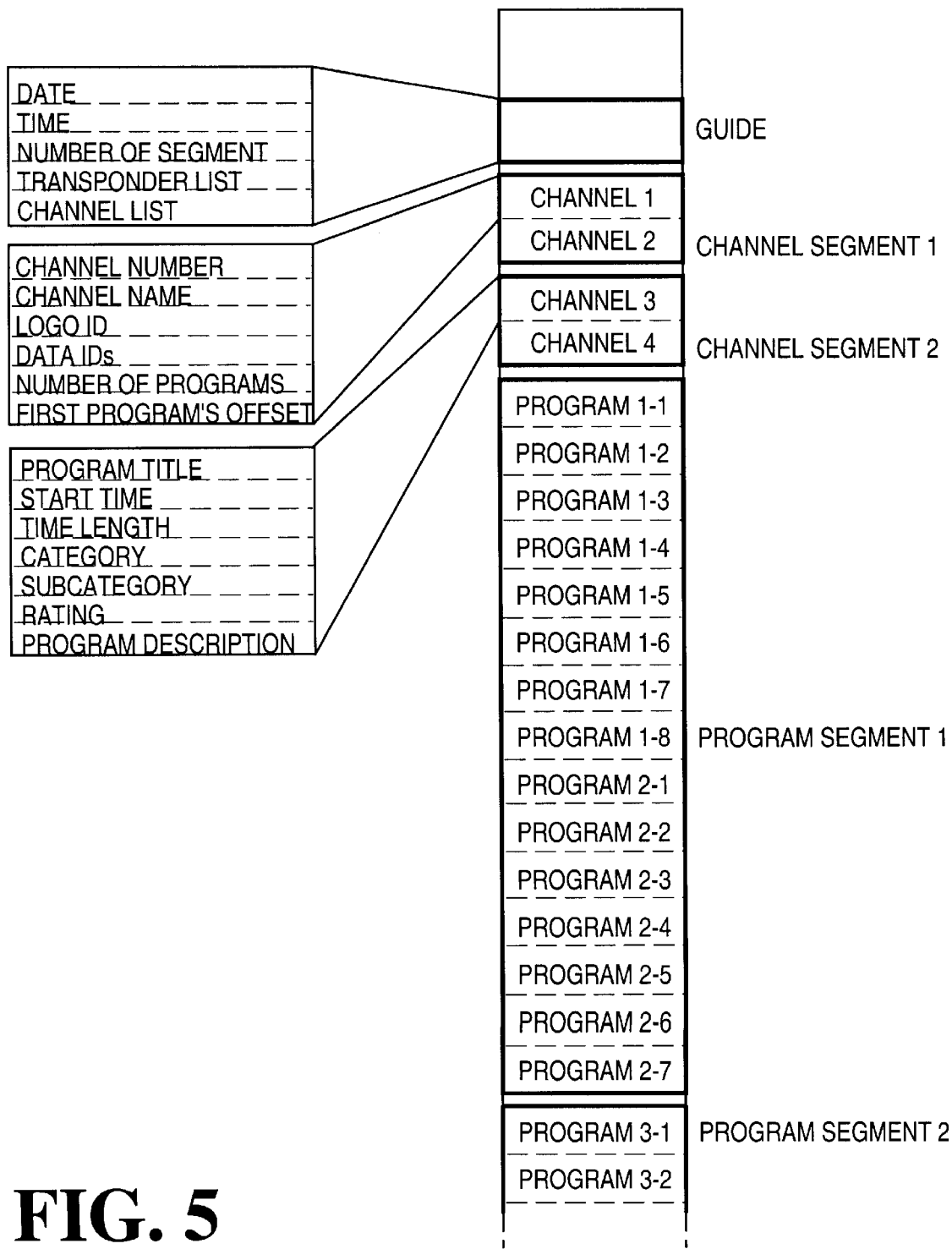
FIG. 5 illustrates the type of data utilized to present the electronic program guide in accordance with the teachings of the present invention.

FIG. 5 is a block diagram illustration of the data stored in a portion of the data buffer RAM 51. As noted above, the RAM 51 stores EPG data including guide data, channel data, and program data. General information is included in the guide data, for example, the current date and time. The transponder list identifies the number of the transponder transmitting a segment. The channel list identifies the channel number of the first channel of a portion of data. The channel data includes data relating to channels, such as the channel number, channel name (i.e., the call sign of a broadcast station), logo ID (i.e., an identification of the channel logo), data ID, which is an identification of a channel number of MPEG video data or MPEG audio data, number of programs, which identifies the number of programs to be transmitted on a channel during a predetermined time frame, and first program offset which identifies the offset from the header to the first channel data in a segment.

The program data includes the program title, start time of the program, time length of the program, program category such as movies, news, sports, etc., program subcategory such as drama, horror, children's movies or baseball, basketball, football for the sports category, the movie rating and program description that provides a detailed description of the program.

Figure 6:
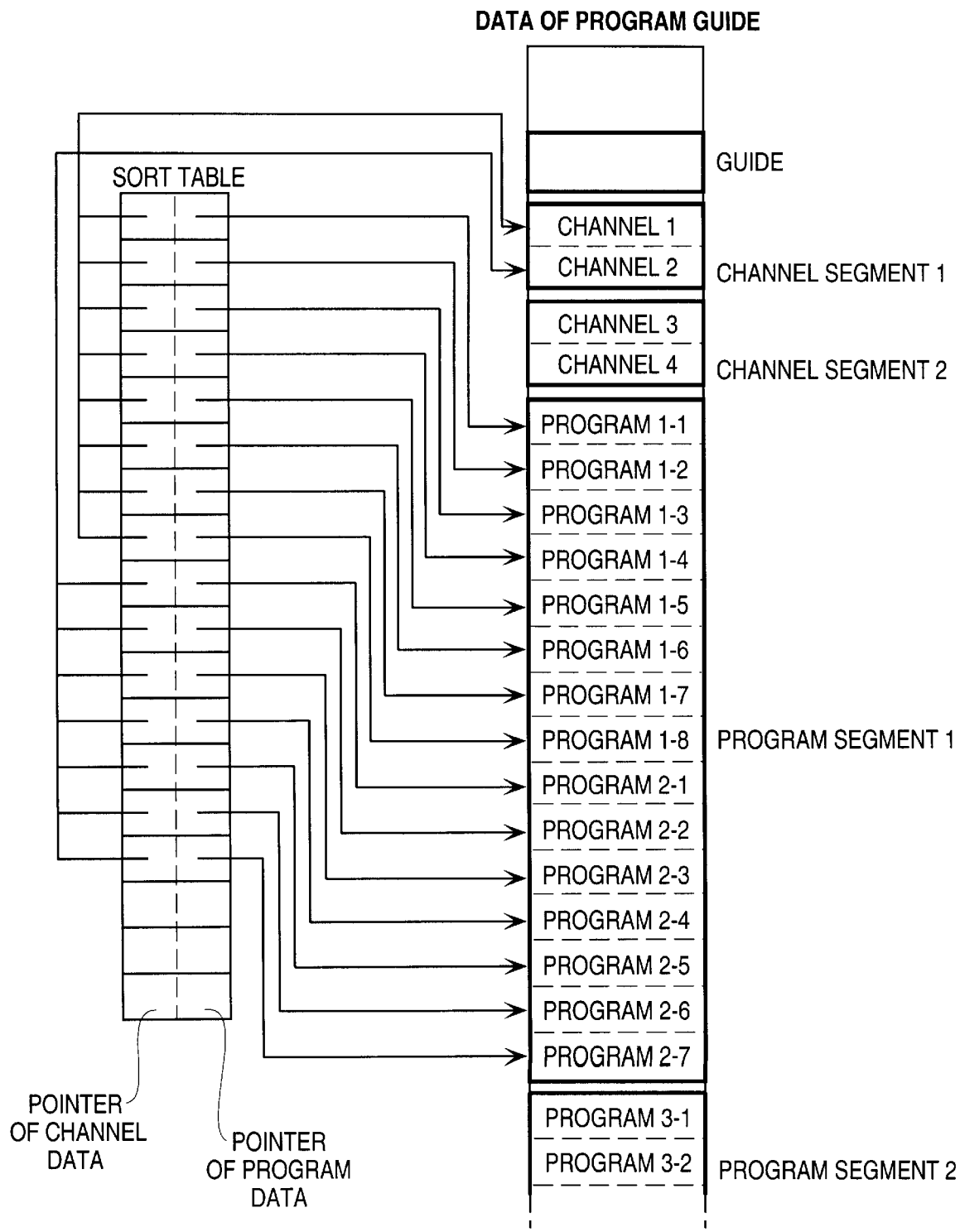
FIG. 6 illustrates the pointers to the data utilized to generate the electronic program guide in accordance with the teachings of the present invention.

FIG. 6 illustrates how pointers to the EPG data are sorted for display on a guide on the user's television screen. As noted above, EPG data includes guide data, channel data and program data which are stored in the Data Buffer (RAM) of the IRD (as shown in FIG. 2). When a viewer selects a channel, the CPU of the system determines the packet containing the channel information and extracts the transponder number from the channel information. The system front end starts tuning in the frequency of the designated transponder so as to receive the data transmitting from that transponder. If a viewer does not select any channel, the last channel is preferably designated.

As noted above, the CPU generates a table of pointers 736 to the EPG stored in the memory. The table 736 is used for changing the order of channels or programs according to the information to be presented in the guide to the user. The table 736 includes an entry for the address pointer to the corresponding channel data and an entry to the corresponding program data.

A table for generating display information is stored in the ROM 37. Certain data from the table is read out from the ROM 37 and stored in DRAM 25a. Preferably the data is stored in compressed form. Therefore, when a character is displayed on a screen, the compressed character array is decoded so as to generate the character to be displayed. The encoder references a dictionary which includes a set of words and frequently used portions of words and numbers corresponding to each word or portion of a word. The encoder encodes each word to each number by using the dictionary. The decoder references the same dictionary as the encoder to perform the decode function. Once decoded, each character of the decoded word includes a character code corresponding to an American Standard Code for Information Interchange (ASCII) code. Nonvolatile memory (e.g., EEPROM 38) has two tables. The first table contains character bitmaps in the different fonts available for each character. The second table identifies the address in the first table at which to extract the character bitmap. The address is determined according to the character code. The bit map image of the character is transmitted to DRAM 25a and subsequently accessed to display the character on the screen.

In one embodiment of the present invention, the channel data is received from a predetermined transponder and the channel number and channel name are stored in DRAM 25a. Additional channel information such as the channel logo is stored in the ROM 36. The ROM 36 preferably includes a table of Logo IDs and the address of Logo Data stored in ROM 36. Therefore, once a Logo ID is determined, the address of the Logo Data is determined, retrieved and stored in DRAM 25a.

The channel data provides the beginning address of the program data for a particular program. The actual location on the screen at which the program information is displayed is dependent upon the format of the guide. For example, in a time-based system, the location where the program title is displayed is determined by the start time and time length stored in the program data.

Using this information downloaded from the satellite transmission, programming and channel selection information is provided to the viewer. In the system and method of one embodiment of the present invention, this information is provided to the user in several innovative manners in order to enable the viewer to easily determine and select stations or programs to be viewed.

Figure 7:
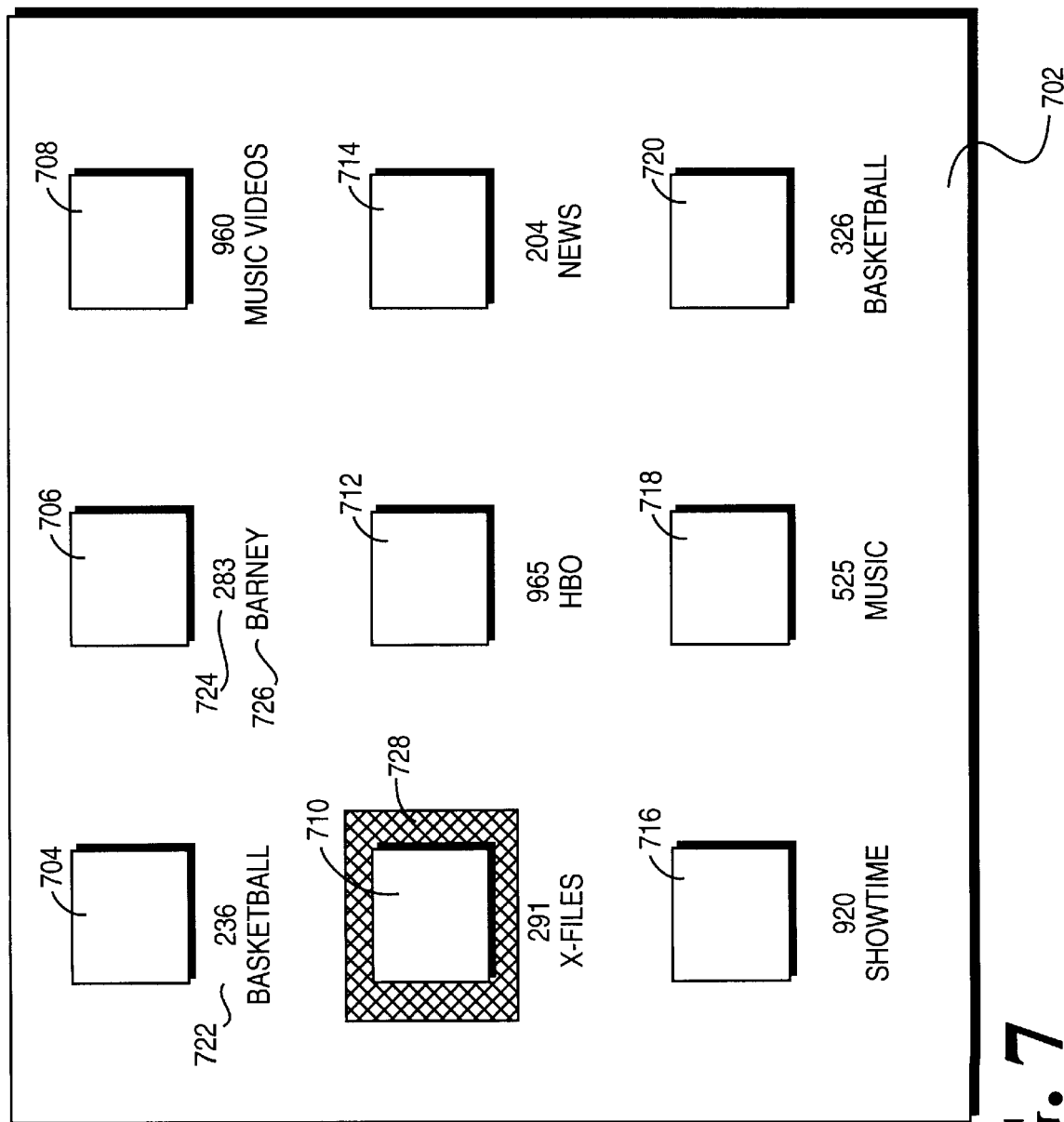
FIG. 7 illustrates the display of a video picture program guide in accordance with the teachings of the present invention.

The multiple channel broadcasting system of one embodiment of the present invention comprises a video picture program guide by which a user can select channels for viewing. This video picture program guide provides the option to view a representative sample video frame of each of a number of programs available on a corresponding number of channels. FIG. 7 illustrates the display of a video picture program guide in accordance with the teachings of the present invention. This video picture program guide 702 of one embodiment of the present invention comprises, but is not limited to, nine still video pictures 704–720. Each still video picture 704–720 displays a visually usable video frame from one of nine channels available on the broadcast system. Some program information 722 may be displayed along with each of the still video pictures 704–720. This program information 722 may include, but is not limited to, channel number 724, channel identifier, program name 726, and program description.

A system pointer 728 is also displayed on the video picture program guide. The system pointer 728 is a frame having dimensions larger than the dimensions of still video pictures 704–720. The system pointer 728 has a color that provides a contrast with the background color of the video picture program guide 702. In one embodiment, the system pointer 728 is orange. The system pointer 728 is manipulated in response to input by the user using a remote control device. In order to select a particular channel for viewing from the video picture program guide 702, the user manipulates the system pointer frame to surround a particular still video picture using the remote control cursor. The user then selects the particular still video picture with the remote control, causing the broadcast system to remove the video picture program guide 702 from the screen, tune the broadcast system to the channel selected, and display the program broadcast on that channel.

Figure 8:
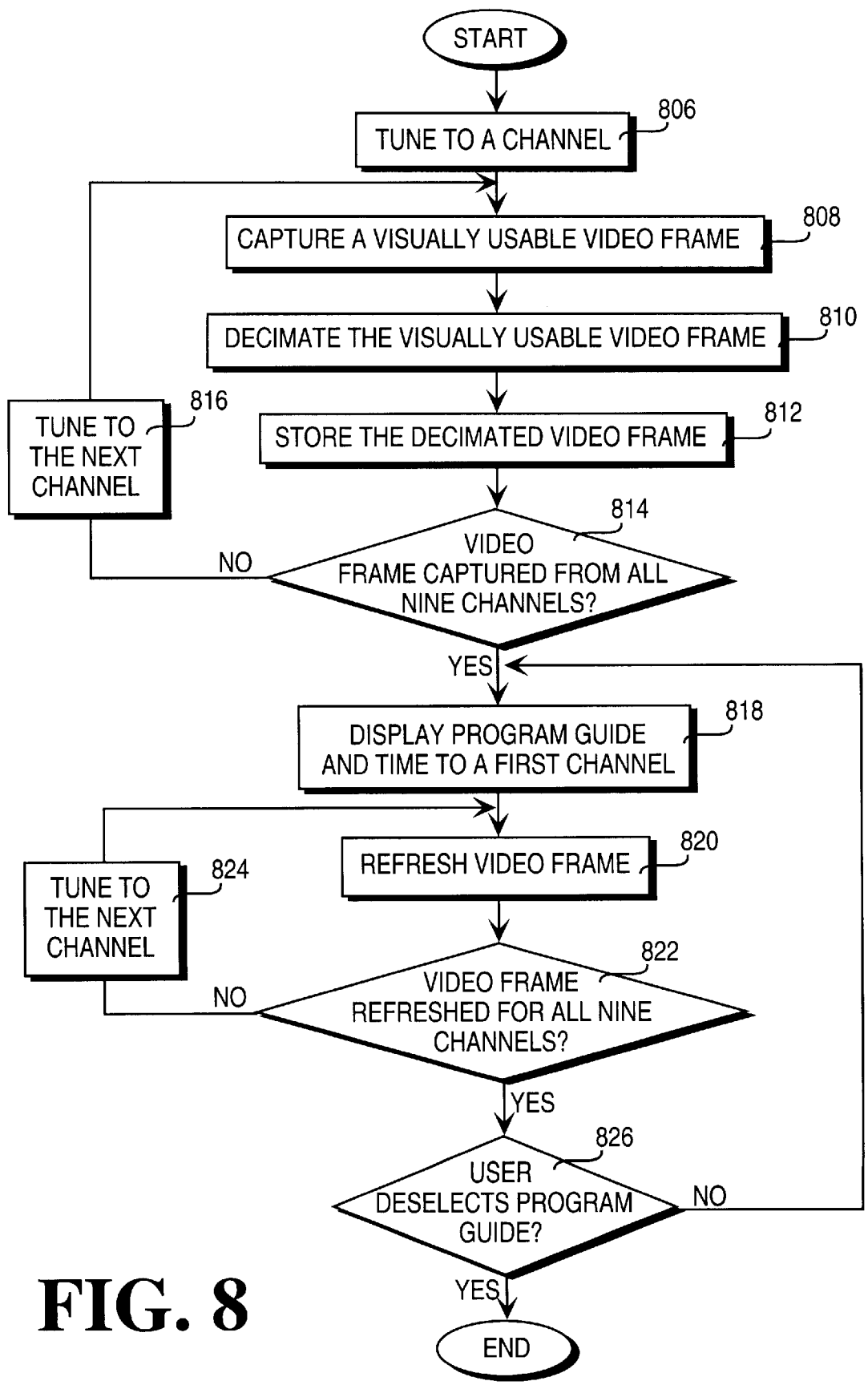
FIG. 8 is an exemplary flowchart illustrative of providing a video picture program guide comprising still video pictures in one embodiment of the present invention.

FIG. 8 is an exemplary flowchart illustrative of providing a video picture program guide comprising still video pictures in one embodiment of the present invention. The first time a user selects the video picture program guide, the broadcast system displays an on-screen menu through which the user may configure the video picture program guide display. Using this on-screen menu, the user may configure the video picture program guide by selecting up to nine channels for inclusion in the video picture program guide. After configuring the video picture program guide, subsequent selection of the video picture program guide will result in display of the channels selected for inclusion by the user. The broadcast system also allows the user to reconfigure the video picture program guide at some later time to include different channels. Alternatively, if the user chooses not to configure the video picture program guide, the broadcast system may exercise a default routine that will select up to nine channels for inclusion in the video picture program guide. The default routine may, for example, include the first nine channels from an electronic program guide, or it may include the first nine channels from a favorite station guide, or it may include the first nine channels from a particular category guide or a most watched category guide, or it may include the first nine most watched stations. The remainder of the discussion of the flowchart of FIG. 8 assumes that nine channels have been selected for display on the video picture program guide using one of the aforementioned processes.

Following selection of a number channels for inclusion in the video picture program guide, the multiple channel broadcasting system generates the video picture program guide. Generation of the video picture program guide begins at block 806, at which the broadcast system tunes to the first of the nine channels comprising the video picture program guide. A single visually usable video frame is captured from this first channel, at block 808. The visually usable video frame is the Intra frame, or I frame, in a Motion Picture Experts Group-2 (MPEG-2) bit stream.

The captured visually usable video frame is then decimated, at block 810. The decimation is a down-conversion filtering process resulting in a reduction of the definition or resolution of the I frame of the picture to a size convenient for display. Decimating the visually usable video frame results in a video frame having pixel dimensions that are a fraction of the dimensions of the originally captured visually usable video frame. The decimation uses known filtering and digital signal processing techniques to eliminate a number of pixels from the captured visually usable video frame. For example, a decimation technique might drop, but is not limited to dropping, every other pixel from the visually usable video frame, thereby providing a video frame having pixel dimensions that are one-half of the pixel dimensions of the visually usable video frame. The number of pixels eliminated from the captured visually usable video frame is determined by the number of video frames that are to be displayed on the video picture program guide. In one embodiment, the decimated video frame has, but is not limited to, pixel height and width dimensions that are one-fourth of the pixel dimensions of the visually usable video frame. The decimated video frame is stored in a memory, at block 812, for later display.

Operation continues at block 814, at which the broadcast system determines whether a video frame has been captured from all channels selected by the user for the video picture program guide display. If a video frame has not been captured from all selected channels, then operation continues at block 816, at which the broadcast system is sequentially tuned to the next channel selected for display on the video picture program guide. The steps of capturing a visually usable video frame 808, decimating the video frame 810, and storing the video frame 812 are thereby repeated for each channel until a decimated video frame is available for all channels selected by the user for display on the video picture program guide.

When a video frame has been captured from each of the selected channels, operation continues at block 818, at which the video picture program guide is displayed on a screen. As the program guide is displayed comprising each of the still video pictures from each of the selected channels, the broadcast system sequentially retunes to the first channel selected for display on the video picture program guide. At block 820, the video frame of the first still video picture is refreshed. This refreshing comprises repeating the steps of capturing a visually usable video frame, decimating the visually usable frame, and storing the decimated video frame for display. The refreshed video frame is then displayed as a new still video picture for the corresponding channel. Operation continues at block 822, at which the broadcast system determines if the video frame has been refreshed for all selected channels. If the video frame has not been refreshed for all selected channels, the broadcast system sequentially tunes to the next channel, at block 824, and refreshes the next channel still video picture. The process of refreshing the still video pictures continues while the video picture program guide is selected for display. The user may deselect the program guide, at block 826. If the user does not deselect the program guide, operation continues at block 818, at which the program guide continues to be displayed and the broadcast system continues to refresh the still video pictures. Operation ends when the user deselects the video picture program guide.

Along with the video picture program guide, a system pointer is displayed. The system pointer is manipulated in response to input by the user through a remote control device. The system pointer comprises a frame that surrounds one of the number of still video pictures of the program guide, the frame being larger than the still video pictures displayed. The frame is transparent and of a color that provides a contrast with the background color of the program guide. Using a cursor of the remote control device, the user can position the system pointer in an area associated with a particular still video picture and select the corresponding channel for viewing. When the user selects a channel for viewing, the program guide is deselected and the broadcast system tunes to that channel and displays the program broadcasted on that channel.

The invention has been described in conjunction with the preferred embodiment. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. In a multiple channel broadcasting system in which programs are broadcasted for display on a screen, a method for generating an on-screen guide for a user to select channels to view, comprising the steps of:

generating a program guide comprising a plurality of still video pictures representing current programming on a plurality of channels, wherein the step of generating a program guide comprises the steps of, tuning sequentially to each one of the plurality of channels, capturing a visually usable video frame from the one of the plurality of channels, decimating the visually usable video frame;

displaying the program guide on a screen;

displaying a system pointer that is manipulated in response to input by the user; and selecting a channel for viewing using the system pointer manipulated to an area associated with the still video picture of the channel.

2. The method of claim 1, wherein the steps of tuning, capturing, and decimating are repeated for each of the plurality of channels.

3. The method of claim 1, wherein the visually usable video frame is the Intra frame (I frame) in a Motion Picture Experts Group-2 (MPEG-2) bit stream.

4. The method of claim 1, wherein the step of decimating the visually usable video frame comprises filtering and decimating the Intra frame (I frame).

5. The method of claim 1, wherein the step of decimating the visually usable video frame provides a video frame that is one-fourth of the pixel dimensions of the visually usable video frame.

6. The method of claim 1, further comprising the step of manipulating the system pointer among areas of the program guide associated with each of the plurality of still video pictures.

7. The method of claim 1, further comprising the steps of:

refreshing the decimated visually usable video frame, the refreshing occurring sequentially for the plurality of channels; and storing the refreshed video frame in a memory.

8. The method of claim 1, further comprising the step of selecting a plurality of channels for inclusion in the program guide from a plurality of channels broadcasted by the multiple channel broadcasting system.

9. The method of claim 8, wherein the program guide comprises nine still video pictures representing nine channels, the nine channels selected by using an on-screen menu.

10. The method of claim 1, further comprising the step of displaying corresponding channel and program information with each of the plurality of still video pictures.

11. A computer system comprising a processor configured to be coupled to a display device, said processor:

configured to generate a program guide comprising a plurality of still video pictures representing current programming on a plurality of channels, wherein the processor is configured to generate a program guide by being further configured to, tune sequentially to each one of the plurality of channels, capture a visually usable video frame from the one of the plurality of channels, the visually usable video frame being the Intra frame (I frame) in a Motion Picture Experts Group-2 (MPEG-2) bit stream, filter and decimate the visually usable video frame, and store the decimated visually usable video frame for display;

configured to display the program guide on a screen;

configured to display a system pointer that is manipulated in response to input by the user; and configured to select a channel for viewing using the system pointer manipulated to an area associated with the still video picture of the channel.

12. The computer system of claim 11, wherein the processor is configured to capture, filter, decimate, and store after tuning sequentially to each of the plurality of channels.

13. The computer system of claim 11, wherein the processor is further configured to manipulate the system pointer among areas of the program guide associated with each of the plurality of still video pictures.

14. The computer system of claim 11, wherein the processor is configured to generate a program guide by being further configured to:

refresh the decimated visually usable video frame, the refreshing occurring sequentially for the plurality of channels; and store the refreshed video frame in a memory.

15. The computer system of claim 11, wherein the processor is further configured to control the selection of a plurality of channels for inclusion in the program guide.

16. A system for generating an on-screen guide for a user to select channels to view in a multiple channel broadcasting system in which programs are broadcasted for display on a screen, comprising:

a program guide comprising a plurality of still video pictures representing current programming on a plurality of channels, wherein the program guide is generated by, tuning sequentially to each one of the plurality of channels, capturing a visually usable video frame from the each one of the plurality of channels, the visually usable video frame being the Intra frame (I frame) in a Motion Picture Experts Group-2 (MPEG-2) bit stream, decimating the visually usable video frame, refreshing the decimated visually usable video frame, storing the decimated visually usable video frame;

a screen for display of the program guide;

a system pointer that is manipulated in response to input by the user; and a channel selected for viewing using the system pointer manipulated to an area associated with the still video picture of the channel.

17. The system of claim 16, wherein the system pointer is manipulated among areas of the program guide associated with each of the plurality of still video pictures.

18. The system of claim 16, wherein a plurality of channels are selected for inclusion in the program guide from a plurality of channels broadcasted by the multiple channel broadcasting system.

19. A computer readable medium containing executable instructions which, when executed in a processing system, causes the system to perform the steps for generating an on-screen guide for a user to select channels to view in a multiple channel broadcasting system comprising:

generating a program guide comprising a plurality of still video pictures representing current programming on a plurality of channels, wherein the generating a program guide further causes the system to perform the steps of, tuning sequentially to each one of the plurality of channels, capturing a visually usable video frame from the each one of the plurality of channels, the visually usable video frame being the Intra frame (I frame) in a Motion Picture Experts Group-2 (MPEG-2) bit stream, decimating the visually usable video frame;

displaying the program guide;

displaying a system pointer that is manipulated in response to input by the user; and selecting a channel for viewing using the system pointer manipulated to an area associated with the still video picture of the channel.

20. The computer readable medium of claim 19, further causing the system to perform the step of manipulating the system pointer among areas of the program guide associated with each of the plurality of still video pictures.

21. The computer readable medium of claim 19, further causing the system to perform the steps of:

refreshing the decimated visually usable video frame, the refreshing occurring sequentially for the plurality of channels; and storing the refreshed video frame in a memory.

22. The computer readable medium of claim 19, further causing the system to control selecting a plurality of channels for inclusion in the program guide.

\* \* \* \* \*